FIG. I

INVENTOR.
EARL W. NELSON
JAMES E. BONDURANT
GUY C. MARCOT
BY
ATTORNEY

United States Patent Office 3,062,621
Patented Nov. 6, 1962

3,062,621
TITANIUM DIOXIDE PIGMENT AND COMPOSITIONS CONTAINING THE SAME
Earl W. Nelson and James E. Bondurant, Lynchburg, Va., and Guy C. Marcot, Bound Brook, N.J., assignors to American Cyanamid Company, New York, N.Y., a corporation of Maine
Filed July 7, 1960, Ser. No. 41,353
2 Claims. (Cl. 23—202)

This is a continuation-in-part of our application, Serial No. 772,651, filed November 5, 1958, now U.S. Patent No. 2,957,753, which is a continuation-in-part of our application Serial No. 519,892, filed on July 5, 1955 now abandoned.

The present invention relates to spherical titanium dioxide pigment, to pigment and coating compositions having a content thereof, and to methods for manufacturing spherical titanium dioxide pigment and the compositions referred to.

The titanium dioxide pigment particles produced in the past have been non-spherical in form, the pigment particles or "ultimates" (the particles having dimensions of about $0.1$–$0.5\mu$ being acicular (lath-like), plate-like, coarsely crystalline (resembling loaves of bread), ovoidal (resembling Rugby footballs), or otherwise asymmetrically shaped, depending on the particular conditions which prevailed during their formation.

The pigment of the present invention consists essentially of spherical ultimate particles of titanium dioxide. At least 90% by weight of the particles fall within the pigmentary size range of $0.1\mu$ to $0.4\mu$. The shape of the particles is virtually perfectly spherical, the ratio of the greatest to the least dimension of at least 90% by weight of the particles being less than 1.2:1. The surface of the particles is smooth and free from chips and from crystal growth processes. The pigment possesses the normal whiteness of titanium dioxide and is useful for all the purposes for which titanium dioxide pigment has been used in the past.

Figure 1:
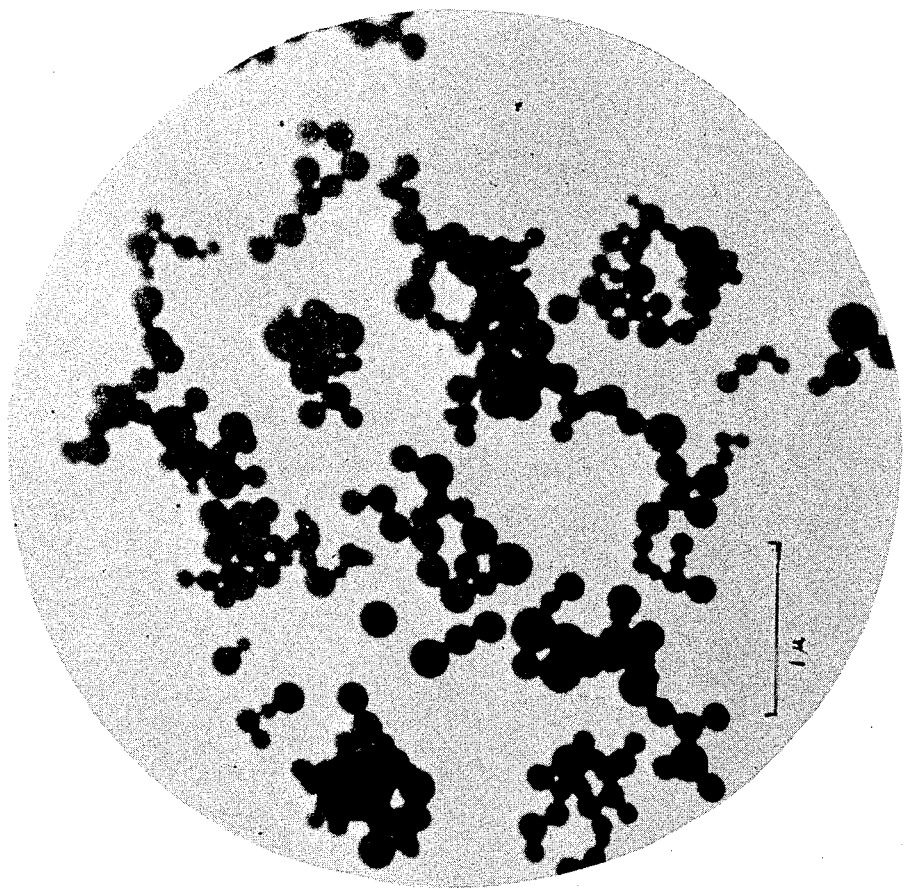

As to composition, the particles are at least 90% titania ($TiO_2$), by weight and may contain the usual small percentages, up to 10% by weight, of conditioning agents or stabilizers such as the oxides of zinc, aluminum, antimony, chromium and silicon. The pigment of the present invention is illustrated by FIGURE 1 of the drawings, which reproduces an electron photomicrograph at 30,000 magnification, based on the scale shown thereon. Each of the spheres in the photomicrograph is an ultimate pigment particle composed of 98.5% of titanium dioxide and 1.5% $Al_2O_3$ by weight. More than 90% of the particles by weight have diameters in the pigmentary size range. The particles appear precisely spherical and perfectly smooth, so that the specific surface area of the particles is minimal. As a result, when the pigment is formulated into fluid surface coating compositions, the compositions have lower consistencies per unit weight of pigment therein. Moreover, after application, the coatings display better resistance to chalking on aging.

Pigment of the present invention may be produced by forming a homogeneous combustion mixture containing titanium dioxide and oxygen in about equimolecular proportions and carbon monoxide and oxygen in 2:1 molar ratio, forming this mixture in an insulated combustion chamber at a temperature above the flow point of titanium dioxide, and maintaining the titanium dioxide thereby produced above its flow point until intra-particle flow of titanium dioxide ceases and spherical titanium dioxide particles therefore result. From the process point of view the invention rests on our discovery that it is possible by use of a pre-formed mixture of titanium tetrachloride and oxygen containing sufficient carbon monoxide-oxygen as auxiliary heating component therein, to carry the combustion temperature up to or beyond the flow point of titanium dioxide, so that spherical pigment particles result.

The minimum amount of the carbon monoxide-oxygen auxiliary mixture needed in any one instance is conveniently found by trial; when sufficient of this auxiliary mixture is present in the combustion gas, the pigment particles produced become spherical. The pigment can be examined as it is produced by bleeding off a small stream of the gaseous pigment suspension from the burner discharge pipe and passing adhesive-coated glass slides through the suspension. The slides can be rapidly examined under an electron microscope and a determination made whether more of the auxiliary gas mixture is needed or whether sufficient is already present.

Additional methods for the manufacture of spherical titanium dioxide pigment particles are disclosed in our above-identified copending application, which is hereby incorporated by reference in the present application.

Any desired amount of external or other pigmentary material such as magnesium silicate, phthalocyanine blue, ultramarine blue, carbon black or any of the numerous organic pigments may be mixed with a spherical titanium dioxide pigment of the present invention. The resulting pigment comprises spherical titanium dioxide pigment particles and is therefore within the scope of the present invention.

Fluid surface-coating compositions containing spherical titanium dioxide pigment particles of the present invention are prepared in the same manner as in the past by use of heretofore known titanium dioxide pigment. Thus, the pigment may be mixed into standard lacquer formulations, latex formulations, and oil paint formulations, the pigment having the advantage of providing coating compositions which have a lower consistency than would otherwise be the case.

The invention will be more particularly described with reference to the examples which constitute specific embodiments of the invention and which are not to be construed as limitations thereof.

*Example 1*

Figure 2:
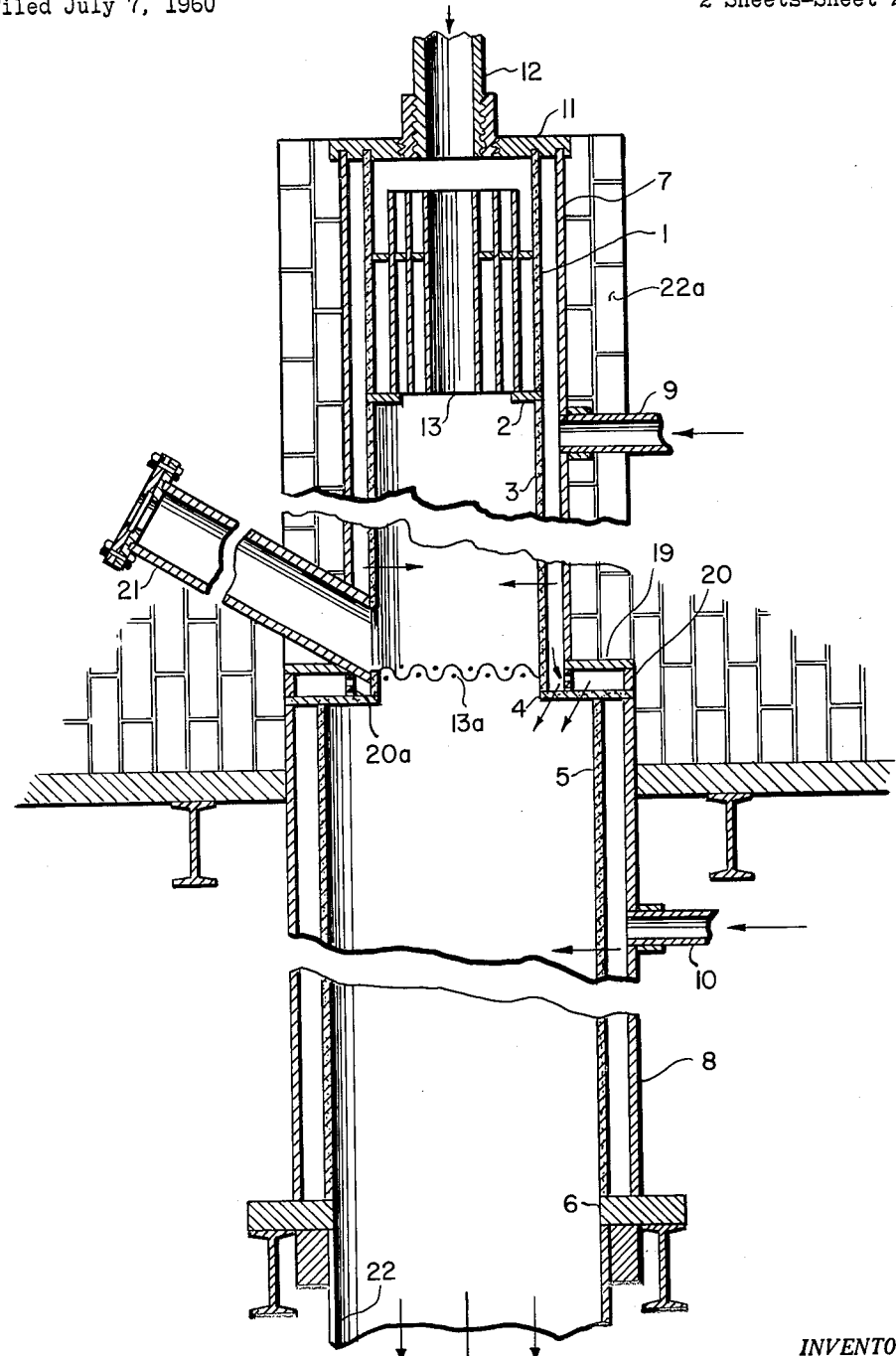

The apparatus employed is illustrated by FIGURE 2 of the drawings and was a vertical, cylindrical reactor principally composed of an upper precombustion porous or gas-permeable tube divided into upper flow stabilizing section 1 resting on perforated disc 2, lower uncleating section 3 resting on perforated porous disc 4, and lower porous cooling tube 5 resting on perforated non-porous disc 6. Porous tubing sections 1 and 3 are jacketed with non-porous tubing 7, and porous tubing section 5 is jacketed with non-porous tubing 8. Pipes 9 and 10 pass through jackets 7 and 8 so that a purge gas or liquid may be supplied under low pressure into the space between the jackets and the inner porous tubing thereby forcing the gas or liquid through tubes 3 and 5 as shown by the arrows and thereby preventing adhesion of pigment particles thereto during operation of the apparatus. The upper end of the reactor is closed by removable channeled aluminum disc 11 provided with removable axially located aluminum combustion gas supply tube 12. Turbulence suppressor 13 (formed by nesting three aluminum tubes of decreasing diameter) rests on disc 2 in the upper part of the reactor. Screen 13–*a* (of 40-mesh screening) represents a series of four such screens positioned across tube 4 near the exit end thereof which assist turbulence suppressor 13 in imparting a desirably flat transverse velocity profile to the gaseous stream. Non-porous disc 19, non-porous ring 20 and non-porous perforated ring 20–*a* permit the inner lower surface of perforated disc 4 to be flushed with gas. Sight port 21 extends through the lower part of tube 3 permitting the flame front to be viewed when (as is usually the case) the flame is maintained at the junction of the large and small tubes. The apparatus discharges into removable tube 22 which may be provided with a conventional water-jacket (not shown) and the discharge is led to apparatus adapted to separate titanium dioxide pigment from chlorine gas such as cyclone separator and Cottrell precipitator.

Jacket 7 and upper part of jacket 8 are packed to a depth to about two feet in insulating brick 22-a.

The apparatus was constructed as follows. Standard Alundum shapes having a wall thickness of about ¼" to ½" were generally used. The porous refractory was porous Alundum having the porosity indicated by an apparent specific gravity of about 2.3. The diameter of tubes 1 and 3 was 3.25" and their combined length 45"; the bottom 6" of tube 3 was Alundum, but tube 1 and the remainder of tube 3 were of silica. The diameter of upper jacket 7 was 4" and the length of turbulence suppressor 13 was 18". The diameter of combustion gas supply tube 12 was 1.5". Cooling tube 5 was 6" in diameter and 24" long. The upper tube was encased in 6" and the lower tube in 12" of insulating brick. Nitrogen gas at room temperature and 0.5" Hg pressure was passed into the jacket where it percolated through the porous tubing at a rate equivalent to about 0.6 ft.$^3$ of gas (N.T.P.) per ft.$^2$ of wall surface per minute.

The apparatus was preheated to 1,000° C. by passing nitrogen at 300° C. into the upper tube through orifice 12 and by burning separately admitted carbon monoxide in the upper portion of the 6" tube. Heating was discontinued. A titanium tetrachloride-carbon monoxide-oxygen combustion mixture in 1.0:2.65:3.0 molar ratio preheated to 400° C. was passed through combustion free orifice 12.

The gas ignited spontaneously in the 6" tube. With adjustment of the gas flow, a laminar flame front formed at the exit end of the 3.25" Alundum tube and burned steadily there, producing titanium dioxide and chlorine.

Analysis of the pigment by X-ray diffraction showed that 96% was anatase, the remainder being rutile. Evaluation showed that the pigment had an excellent tint tone. An electron photomicrograph showed that the ultimate particles were spherical, that the diameter of these particles was about 0.2μ, and that practically all of the particles were between 0.1μ and 0.3μ in diameter.

*Example 2*

The pigment of Example 1 was formulated into an oil paint by adding 250 g. of pigment to 100 g. of heat-bodied linseed oil (iodine value 155–165, acid number 4–6, saponification number 189–195) in a standard laboratory change-can mixer, and mixing until a ball had formed and the ball had "broken" to form a mobile system. Mixing was continued for five minutes thereafter. Linseed oil was then added to decrease pigmentation to 61% and mixing was continued for three minutes. The resulting paste was given two passes at a tight setting through a laboratory three-roll mill. The product was a well-pigmented linseed oil paint which possessed superior (lower) consistency.

The above results show that the pigmented lacquers and other surface coatings have lower consistency when formulated with spherical titanium dioxide pigment.

We claim:

1. A method of producing spherical titanium dioxide ultimate pigment particles which consists essentially in burning titanium tetrachloride with oxygen and carbon monoxide at a temperature above the flow point of titanium dioxide, and maintaining said titanium dioxide at said temperature until flow of said titanium dioxide has substantially ceased.

2. A method of producing spherical titanium dioxide ultimate pigment particles, which consists essentially in burning titanium tetrachloride with oxygen and carbon monoxide at a temperature sufficiently above the flow point of titanium dioxide that spherical titanium dioxide pigment particles thereby form.

References Cited in the file of this patent

UNITED STATES PATENTS

| | | |
|---|---|---|
| 2,462,978 | Krchma et al. | Mar. 1, 1949 |
| 2,488,439 | Schaumann | Nov. 15, 1949 |
| 2,559,638 | Krchma et al. | July 10, 1951 |
| 2,591,988 | Wilcox | Apr. 8, 1952 |
| 2,635,946 | Weber | Apr. 21, 1953 |
| 2,739,904 | Frey | Mar. 27, 1956 |
| 2,798,819 | Schaumann | July 9, 1957 |
| 2,805,921 | Schaumann | Sept. 10, 1957 |

OTHER REFERENCES

Quinn, American Ink Maker, February 1959, pages 30, 31, 57 and 59.

Thornton: "Titanium," ACS Chemical Monograph Series, 1927, page 49.